United States Patent
DiCrescenzo

(10) Patent No.: US 8,397,063 B2
(45) Date of Patent: Mar. 12, 2013

(54) METHOD FOR A PUBLIC-KEY INFRASTRUCTURE FOR VEHICULAR NETWORKS WITH LIMITED NUMBER OF INFRASTRUCTURE SERVERS

(75) Inventor: Giovanni DiCrescenzo, Madison, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 306 days.

(21) Appl. No.: 12/835,001

(22) Filed: Jul. 13, 2010

(65) Prior Publication Data

US 2011/0083011 A1    Apr. 7, 2011

Related U.S. Application Data

(60) Provisional application No. 61/249,473, filed on Oct. 7, 2009.

(51) Int. Cl.
   *H04L 29/06* (2006.01)
(52) U.S. Cl. .................... 713/158; 726/1; 726/2; 726/3; 726/6; 726/14
(58) Field of Classification Search .................. 713/158; 726/1–3, 6, 14
   See application file for complete search history.

(56) References Cited

U.S. PATENT DOCUMENTS

| | | | |
|---|---|---|---|
| 7,340,770 B2* | 3/2008 | Freund | 726/11 |
| 7,366,892 B2* | 4/2008 | Spaur et al. | 713/151 |
| 8,090,949 B2* | 1/2012 | Bellur et al. | 713/175 |
| 2004/0019807 A1 | 1/2004 | Freund | |
| 2006/0255910 A1* | 11/2006 | Fukushima et al. | 340/5.65 |
| 2008/0137860 A1* | 6/2008 | Silvernail | 380/270 |
| 2008/0148374 A1 | 6/2008 | Spaur et al. | |
| 2009/0046854 A1* | 2/2009 | Di Crescenzo et al. | 380/44 |
| 2009/0201139 A1* | 8/2009 | Zimmermann et al. | 340/426.13 |
| 2009/0235071 A1 | 9/2009 | Bellur et al. | |
| 2010/0031042 A1* | 2/2010 | Di Crescenzo et al. | 713/169 |
| 2011/0258435 A1* | 10/2011 | Bellur et al. | 713/158 |

OTHER PUBLICATIONS

Patent Cooperation Treaty International Search Report, Nov. 21, 2010.

* cited by examiner

*Primary Examiner* — Krisna Lim
(74) *Attorney, Agent, or Firm* — Philip J. Feig

(57) ABSTRACT

A system, and method related thereto, for providing a vehicular communications network public-key infrastructure. The system comprises a plurality of communications infrastructure nodes and a plurality of vehicles each having a communications component. The communications component provides vehicle to vehicle (V2V) communications, and communications via infrastructure nodes. A communications security component in each of the plurality of vehicles provides security for the communications between the plurality of vehicles using a plurality of security modules. The security modules include a certificate management module. A public key interface module may include a public key, a private key, an anonymous key and a management key. The system further includes a detection and response module for attack detection and attack mitigation. The communications security component assigns and installs at least one security key, a certificate of operation, and a current certificate revocation list. The communications component provides secure communications between the plurality of vehicles.

24 Claims, 6 Drawing Sheets

METHOD FOR A PUBLIC-KEY INFRASTRUCTURE FOR VEHICULAR NETWORKS WITH LIMITED NUMBER OF INFRASTRUCTURE SERVERS

CROSS-REFERENCE TO RELATED APPLICATION

This application claims priority under 35 U.S.C. §119(e) of U.S. Provisional Patent Application Ser. No. 61/249,473, filed Oct. 7, 2009, the disclosure of which is hereby incorporated by reference in its entirety.

FIELD OF THE INVENTION

The present invention relates to vehicular communications networks, and more particularly, the present invention relates to providing security for vehicular communications networks.

BACKGROUND OF THE INVENTION

Vehicular networks provide communications between vehicles. However, the network is exposed to a number of threats or attacks which may originate from various sources having different motivations. The network attacks may include a computer virus which attacks network communications. Also, network attacks may include attacks on privacy and malicious behavior attacks such as spam. Previous attempts to provide security for vehicular networks have relied on constant communication with road-side devices acting as servers providing a public-key infrastructure (PKI). Typically, previous solutions either did not consider the role of multiple, distributed, servers in a PKI for a vehicular network, or made unrealistic assumptions about the number of such servers, for instance, by considering the presence of a server in the wireless radio range of each vehicle. Thus, known security solutions for vehicular networks have ignored the problem of eliminating or minimizing the need for various types of costly infrastructure servers. In particular, conventional PKIs typically rely on trusted Certificate Authorities (CAs) or servers for the management of the cryptographic keys (used for public-key encryption or digital signatures) held by the users or clients that are authorized to belong to the PKI. Using a certificate, a trusted CA binds a cryptographic key to a specific user so that other users, by reading the certificate, can verify that a given key belongs to a given PKI user. The CA can exclude from the group any PKI user that exhibits malicious behavior by posting this user's certificate on a Certificate Revocation List (CRL) that is publicly available. Thus, other users, by obtaining the latest CRL from the CA, can verify that a given key belongs to a PKI user whose group membership privileges have not been revoked. Another reason that users need to communicate with the CA is to renew the certificates as these are typically time-limited (to avoid that CRL becoming too large in size). Realizing this communication between CA and PKI users becomes especially difficult in vehicular networks, where vehicles move across a wide geographic area but, due to their limited radio range, can only send messages for short distances. Therefore, the application of PKIs in a vehicular network with moving vehicles results in at least the problem of connecting and maintaining contact with CA servers across a wide geographic area, which may result in a solution of demanding an unreasonably high number of CA servers.

Message security refers to message authentication or integrity protection, and protection against replay attacks. In a distributed, group-based, setting such as a vehicular network, message security may also require authenticating a message as being originated by an authorized group member (i.e., for example, an authorized vehicle instead of an unauthorized computer). Known techniques for achieving message security are based on PKIs and digital signatures. Specifically, a user sends a digital signature of a time-stamped version of the current message together with the message itself and the certificate for the signature verification public key. The receiver checks that the time-stamp, the message's signature and the verification public key's certificate are valid before processing the message's content. This solution assumes the existence of constant availability of network connectivity to a Certificate Authority server infrastructure (to verify, as mentioned before, that the certificate used has not expired) and could also result in excessive computation time and over-the-air message overhead. Computationally lighter variants of this technique may include, for example, a user can check a message's authenticity only if the message's content is deemed to be important enough. Some known variations of this technique try to improve the computational efficiency by implementing signatures using chain-based or tree-based cryptographic hashing, however, this implementation decreases the communication efficiency. Even these variations assume the existence of constantly available network connectivity to the CA and also need the ability to maintain synchronization between sender and receivers. The simple approach of the CA distributing the CRL to all users at a given time t does not provide the desired security as at a later time t'>t, because a user may not be able to communicate to a CA server and thus may have to trust an old (and not updated) CRL.

Typical known methods and systems provide security options for users continuously connected to servers or common communication devices. However, known methods have not addressed, and are not generally suited for, providing security to users using mobile, decentralized communication systems, for example, as in vehicle to vehicle networks. Known networks have not addressed the challenges presented by mobile devices, such as in vehicle to vehicle networks, including their intrinsically mobile and ad-hoc nature, and their simultaneous needs for security and vehicle owner privacy.

It would therefore be desirable to provide a method and system for providing security for a vehicular network. It would further be desirable for a network system to provide security with a limited number of servers, while maintaining network parameters including desired security, privacy, and performance requirements.

SUMMARY OF THE INVENTION

In an aspect of the invention, a method for providing vehicular communications network security comprises: providing a plurality of vehicles in a specified geographic area, each of the plurality of vehicles having a communications component; providing a plurality of communications infrastructure nodes; communicating between the vehicles using the plurality of communication infrastructure nodes, the plurality of communications infrastructure nodes being unable to provide a data connection to each of the plurality of vehicles such that a number of the vehicles having the data connection is less than a number of total vehicles in the specified geographic area; communicating vehicle to vehicle (V2V) using the communication components; providing security for the communications between the plurality of vehicles; assigning and installing in the plurality of vehicles at least one security key, a certificate of operation, and a recent certificate revocation list; and securing communications between the plurality of vehicles using the at least one security key, the certificate of operation and the recent certificate revocation list.

In an aspect of the invention, a system for providing vehicular communications network security comprises: a plurality of communications infrastructure nodes wherein the plurality of communications infrastructure nodes being unable to provide a data connection to each of the plurality of vehicles during any specified time period, such that a number of the vehicles having the data connection is less than a number of total vehicles in the specified geographic area during any specified time period, and a plurality of vehicles each having a communications component. The communications component provides vehicle to vehicle (V2V) communications, and the vehicles communicate with each other using the plurality of communications infrastructure nodes. A communications security component in each of the plurality of vehicles provides security for the communications between the plurality of vehicles. The communications security component includes a plurality of security modules, wherein the security modules include: a certificate management module including certificates, and a certificate revocation list; a public key interface module including at least one of: a public key, a private key, an anonymous key and a management key; a detection and response module for attack detection and attack mitigation; the communications security component having assigned and installed at least one security key, a certificate of operation, and a current certificate revocation list, the communications component providing secure communications between the plurality of vehicles including vehicle to vehicle communications, and vehicle communication using the nodes.

In an aspect of the invention, a method for providing vehicular communications network security comprises: providing a plurality of communications infrastructure nodes, the plurality of communications infrastructure nodes being unable to provide a data connection to each of the plurality of vehicles during any specified time period, such that a number of the vehicles having the data connection is less than a number of total vehicles in the specified geographic area during any specified time period; providing a plurality of vehicles each having a communications component; providing security for communications between the plurality of vehicles; assigning and installing in the plurality of vehicles at least one security key, a certificate of operation, and a current certificate revocation list; selectively communicating between the plurality of vehicles including vehicle to vehicle communications and the nodes; securing communications between the plurality of vehicles using at least the at least one security key, the certificate of operation and the current certificate revocation list; detecting malicious activity in communications between the vehicles; and mitigating the malicious activity including the technique of: users voting as a group, including: a majority voting technique; and a self sacrifice voting technique; or a combination of the majority voting technique and the self sacrifice voting technique.

In an aspect of the invention, a computer program product comprises a computer readable medium having recorded thereon a computer program. A computer system includes a memory device, and the computer system includes a processor for executing the steps of the computer program for providing vehicular communications network security, wherein a plurality of communications infrastructure nodes are provided, and a plurality of vehicles each having a communications component are provided; the program steps comprising: communicating vehicle to vehicle (V2V) using the communications components; communicating between the vehicles using the plurality of communication infrastructure nodes the plurality of communications infrastructure nodes being unable to provide a data connection to each of the plurality of vehicles such that a number of the vehicles having the data connection is less than a number of total vehicles in the specified geographic area; providing security for the communications between the plurality of vehicles; assigning and installing in the plurality of vehicles at least one security key, a certificate of operation, and a current certificate revocation list; selectively communicating between the plurality of vehicles including vehicle to vehicle communications and the nodes; and securing communications between the plurality of vehicles using at least the at least one security key, the certificate of operation and the current revocation list.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
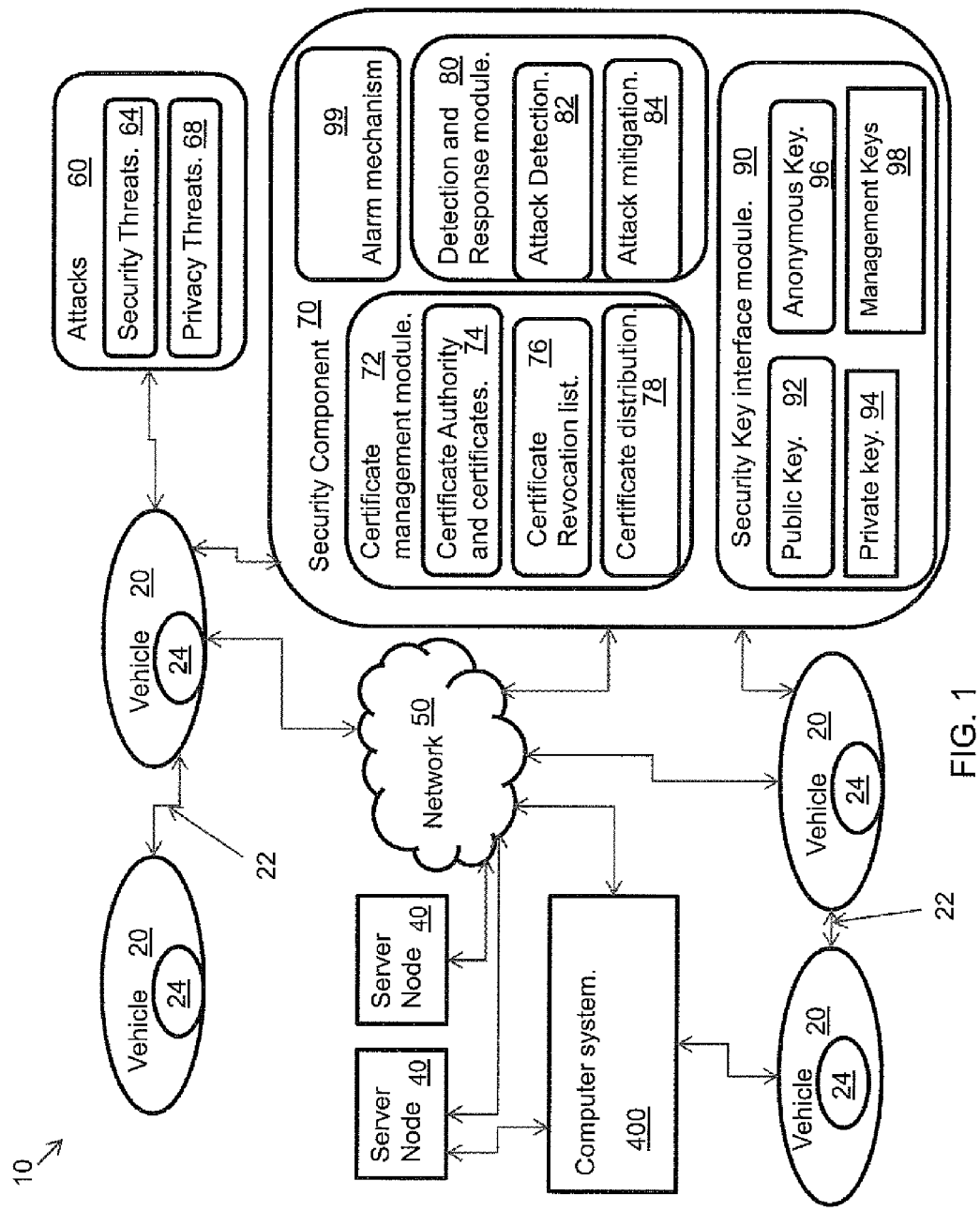
FIG. 1 is a schematic block diagram of a method and system for providing a vehicular communications network according to an embodiment of the invention.
Figure 5:
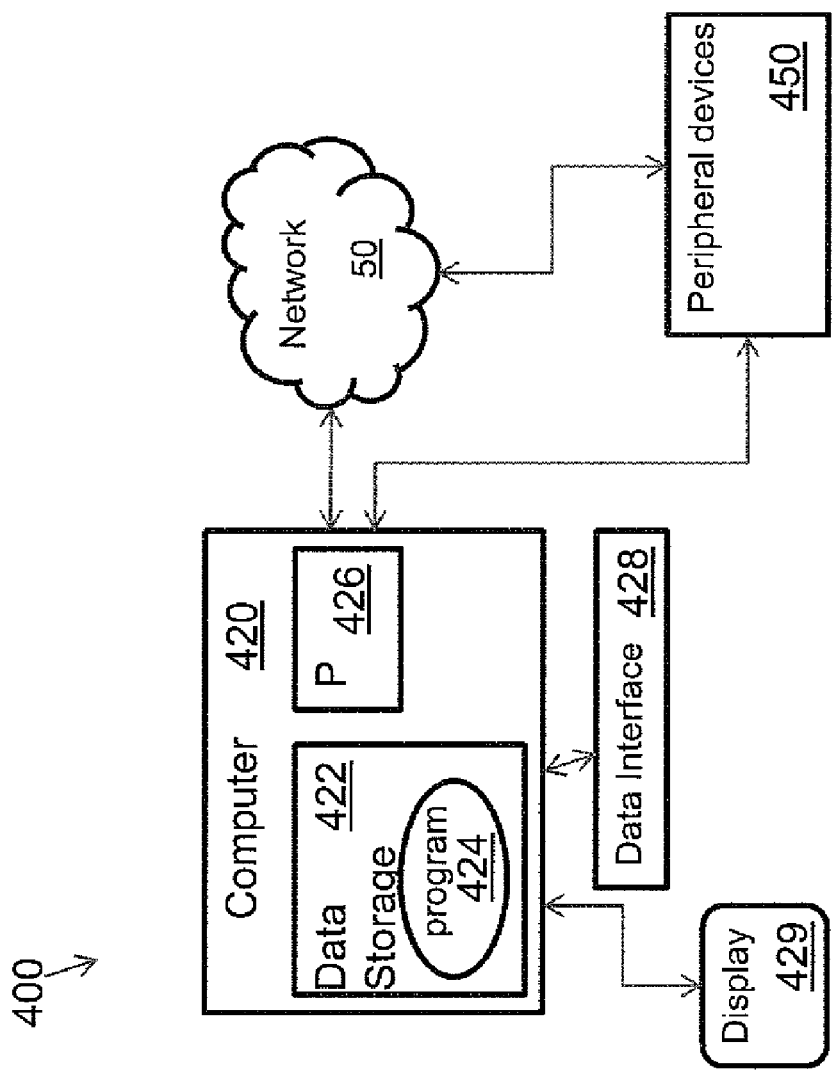
FIG. 5 is a schematic block diagram depicting an embodiment of a computer system.

Referring to FIG. 1, an embodiment of a method 10 (and corresponding system) according to the present invention includes multiple vehicles 20. The vehicles 20 can communicate with each other using vehicle-to-vehicle communications and are capable of communicating with server nodes 40 using a network 50. The server nodes 40 represent static servers, or mobile servers. A static server may include, for example, a multiplicity of fixed servers, or a broadcast server. Mobile servers may include, for example, a server in a vehicle, or a personal data assistant (PDA). Vehicles are depicted as communicating using V2V communications and server communications in FIG. 1. A computer system 400 is representative of computer systems in the vehicles 20 and computer system 400 which the server nodes 40 may be part of. The components of an embodiment of the computer system 400 are shown in FIG. 5.

Hereinafter, terms used in embodiments of the present invention are defined as follows.

Malicious Agents and Motivations

Agents interested in malicious behaviors include all entities that may engage in malicious behaviors and/or profit from it. They can be classified depending on the amount of resources available to cause harm to the vehicular network. For instance, unscrupulous or opportunistic individual, may include: computer hackers; automotive, electronic, or computer hobbyists; very loosely organized groups are examples of attackers who mainly operate on their own and have limited monetary resources. Corrupt insiders and unscrupulous businesses are examples of attackers that are moderately coordinated, communicate on a regular basis, have moderate resources, and can obtain information not publicly known or available. Finally, organized crime and foreign nations are examples of highly organized attackers, with expansive resources, that can infiltrate organizations and obtain closely held secrets, and may lack any consideration other then achieving their goals.

The following list contains some of the potential motivations that may drive agents to exhibit malicious behaviors within a vehicular network. The motivations are generally in an order of increasing impact, and are as follows: random motivation in harming other vehicles or the entire vehicular network; deferential treatment from the vehicular network for the purposes of evading law enforcement, assisting in criminal operations, or diverting attention from a primary attack; prestige in a successful hack or a new virus launch; manipulate traffic authority decisions; acquire personal advantages in driving conditions or economic gain; e.g., committing insurance fraud or car theft; promote national, political, and special interests which may include civil, political and economic disruption, including warfare.

Security Threats and Security Requirements

Security attacks and malicious behaviors based on communications activities in a V2V environment can be categorized as follows:

Attackers can modify the communication content coming from their vehicles' software or hardware, including: inaccurate traffic conditions, including false warnings related to forward collisions, blind spot situations, lane changes, unsafe passing, inaccurate driving conditions or patterns, such as false statements about speeds, braking, directions, positions, and intersection movement. Attackers could also modify the communication functionalities of their vehicles' software or hardware to carry out attacks, such as one of the attacks discussed above, and the following: modifying transmission timing intervals of messages; delaying the delivery of messages; sending more messages than the vehicle is designed to handle; not sending messages for a long enough time interval; disabling the functioning of a vehicle's software, for example, because of privacy concerns. Attackers could attempt to impersonate vehicles or other network entities (e.g., servers) to cause harm to the vehicular network operations. Attackers could also act as intruders attempting to use data stored on vehicles or other network entities (e.g., servers) to cause harm to the vehicular network operations.

In light of the above recited attacks, an embodiment of a set of security requirements is stated as follows:

Security Requirement S-1: In a vehicular network, any of the attacks above succeed with negligible probability or by requiring unfeasible amounts of an attacker's computing resources.

Security Requirement S-2: In a vehicular network, if any of the attacks succeed, a procedure exists that allows the vehicular network to detect with a high probability the attacks and the attackers, and to contain and mitigate their impact.

Privacy Threats and Privacy Requirements

Privacy breaches based on communications activities in a V2V environment are defined as below:

1. Attackers can record messages exchanged between vehicles to significantly increase the probability of, (1a) correctly associating messages to specific vehicles and their owners (thus violating the vehicle owner's anonymity); or (1b) correctly associating the messages in different locations to the same vehicle (thus violating unlinkability);
2. Attackers can modify the communication functionalities of their vehicle's software or hardware to carry out attacks, such as the attacks in (1);
3. Attackers can attempt to impersonate vehicles or other network entities (e.g., servers) to improve their chances of success in the attacks in item (1) and (2); and
4. Attackers can act as intruders and attempt to use data stored on vehicles or other network entities (e.g., servers) to cause harm to the vehicular network operations, for instance, using the attacks in items (1), (2) and/or (3).

Given the above attacks, an embodiment of a set of privacy requirements is stated as follows:

Privacy requirement P-1: In a vehicular network, any of the attacks listed in items 1 through 4 above will succeed with negligible probability or by requiring unfeasible amounts of attacker's computing resources; and Privacy requirement P-2: In a vehicular network, any of the attacks listed in items 1 through 4 above shall only succeed with a known probability.

Impact of Limited Infrastructure Network Connectivity

In the embodiment of the present invention shown in FIG. 1, the method 10 of the present invention uses a conventional certificate management system or module 72 as part of a security component 70. A vehicle infrastructure may include, as in the embodiment of the invention of FIG. 1, a network 50, communications infrastructure nodes or server nodes 40, as well as a communications component 24 in the vehicles 20, and a computer system 400 in the vehicles 20. The security component 70 may be part of a computer program in a computer system which may be located all or in part in the vehicles 20 and on the communications infrastructure nodes 40. Vehicles require infrastructure network 50 connectivity (as representatively shown with some of the vehicles 20) to communicate with Certificate Authorities (CAs) 74 to perform the following operations:

1. Assignment and Installation of Initial Security Keys and Certificates;
2. Message security operations;
3. Distribution of Certificate Revocation Lists (CRLs);
4. Replacement of Expired Certificates;
5. Replacement of Revoked Certificates; and
6. Malicious Behavior Detection, i.e., to provide information to CAs or separate intrusion detection systems for detecting misused certificates and malicious vehicles to determine which certificates and vehicles should be revoked.

Generally, in embodiments of the invention, a vehicle is assigned a plurality of security keys and certificates. A vehicle's initial security keys and their certificates can be installed on vehicles during the vehicle manufacturing process or at the vehicle dealerships before the vehicles are sold. This can be achieved without any roadside infrastructure network connectivity. Alternatively, message security operations may be added which include a number of security measures that any vehicle can add to any message sent to its neighboring vehicles. In the embodiments of the present invention, the measures discussed do not require roadside infrastructure network connectivity, while achieving satisfactory security requirements.

Main certificate management operations are discussed below which limit the impact of limited or complete lack of infrastructure network connectivity.

For vehicle to vehicle (V2V) communications 22, where vehicles have little or no infrastructure network connectivity, a vehicular network needs to satisfy suitable extensions of the previously formulated security and privacy requirements, as follows:

Security requirement S-3: In a vehicular network, if any of the attacks listed above succeed with a noticeable probability, a procedure is implemented, possibly relying on limited and predictable levels of infrastructure network connectivity, or no infrastructure network connectivity at all, that allows the vehicular network to detect with high probability both the attacks and the attackers; and Privacy requirement P-3: In a vehicular network, any of the attacks listed above should succeed only with negligible or known probability, even in scenarios where vehicles can only communicate with a limited number of infrastructure servers, or with no such server at all, or furthermore with a limited number of other vehicles.

Vehicular Networks Modeling

The method 10 of the present invention uses mathematical modeling tools for vehicle networks including roadmap geography models, as well as vehicle density, communication, and mobility models. In addition, modeling is used with infrastructure server models based on the availability of one or more wireless networking options. Simplified geographic, mobility, and communication models can be used such that the vehicular network wireless connectivity graph of the vehicles can be represented at any time t by a random geometric graph $G(t)$ where the graph's edge probability parameter can be expressed using a closed formula. Under generalized and realistic conditions, the vehicles form at time t, a random geometric graph $G(t)$, with an algorithmically computable edge parameter. For example, the expected number of neighbors of the vehicles can be computed with closed form formulas.

Figure 2:
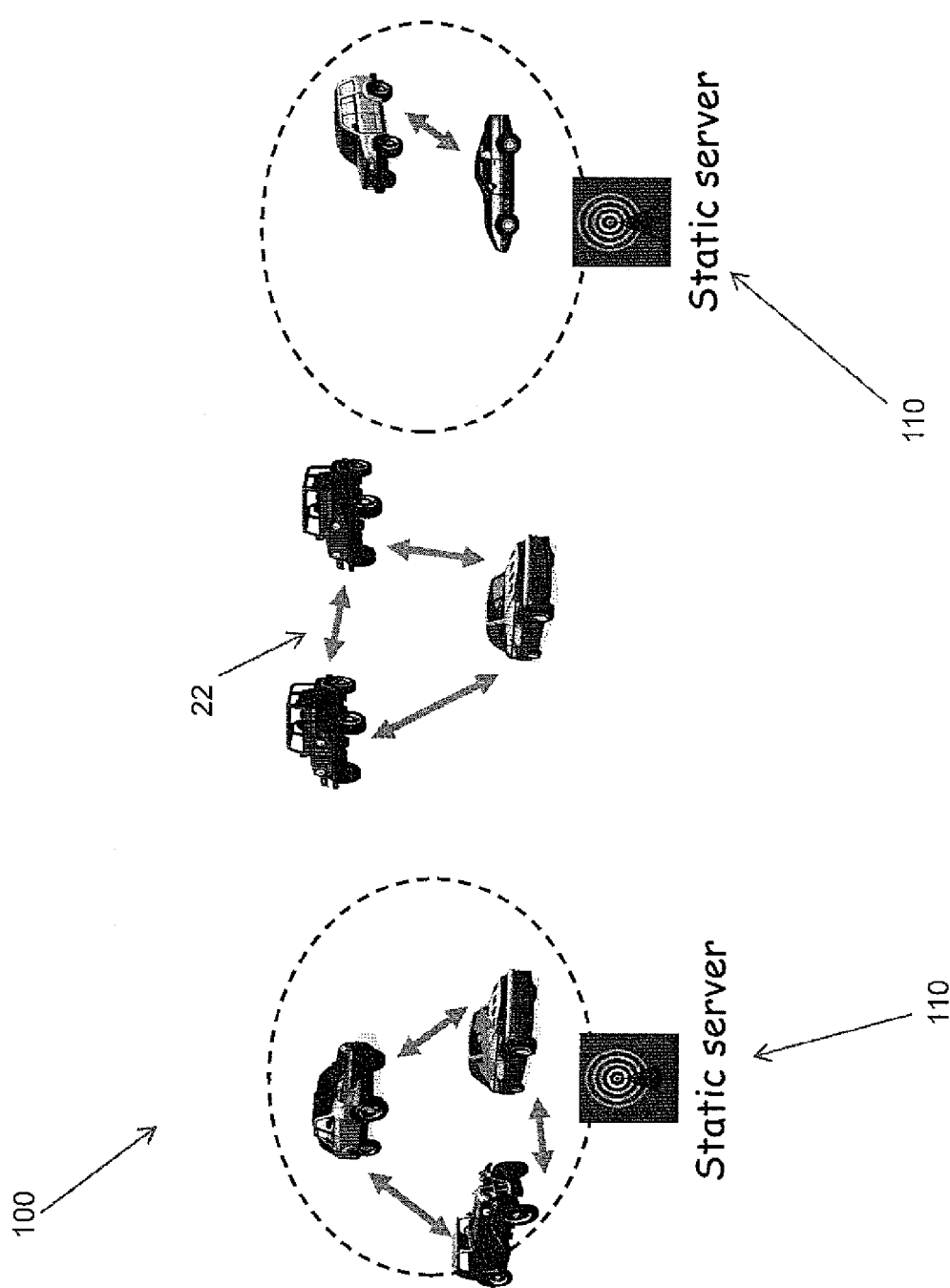
FIG. 2 is a schematic block diagram depicting static servers communicating with vehicles, and vehicle to vehicle communications.

Defined below are infrastructure models that define the existence of the following various types of infrastructure nodes, with reference to FIGS. 2 and 3:

In a static system 100, static infrastructure servers 110, as shown in FIG. 2, include: hotspots, including, for example, vehicle dealerships, parking lots at shopping centers, state inspection centers, providing static V2V communications 22. From a mathematical point of view, these will be modeled as special fixed nodes in the communication graph $G(t)$ with a well-defined initial position distribution (which is in practice expected to somehow approximate vehicle density). Such servers can also model other networking options such as WiFi access in home area networks, and WiFi hot spots along travel routes. In general, the method of the present invention seeks to minimize the use of any form of static infrastructure servers and does not specifically require the deployment of any new roadside server entity.

Mobile infrastructure servers can include government vehicles (e.g., police or emergency vehicles) that can use many of the above discussed wireless networking options, including cellular networks. From a mathematical point of view, the above will be modeled as special nodes in the communication graph $G(t)$ with a well-defined initial position distribution (which is assumed to approximate vehicle density), and a well defined mobility process (which is assumed to be similar to ordinary vehicles' mobility random process). The servers can also model less trusted networking options such as vehicles that can use users' cell phones to communicate with the infrastructure network. The method of the present invention seeks to minimize the use of any form of mobile infrastructure servers.

Figure 3:
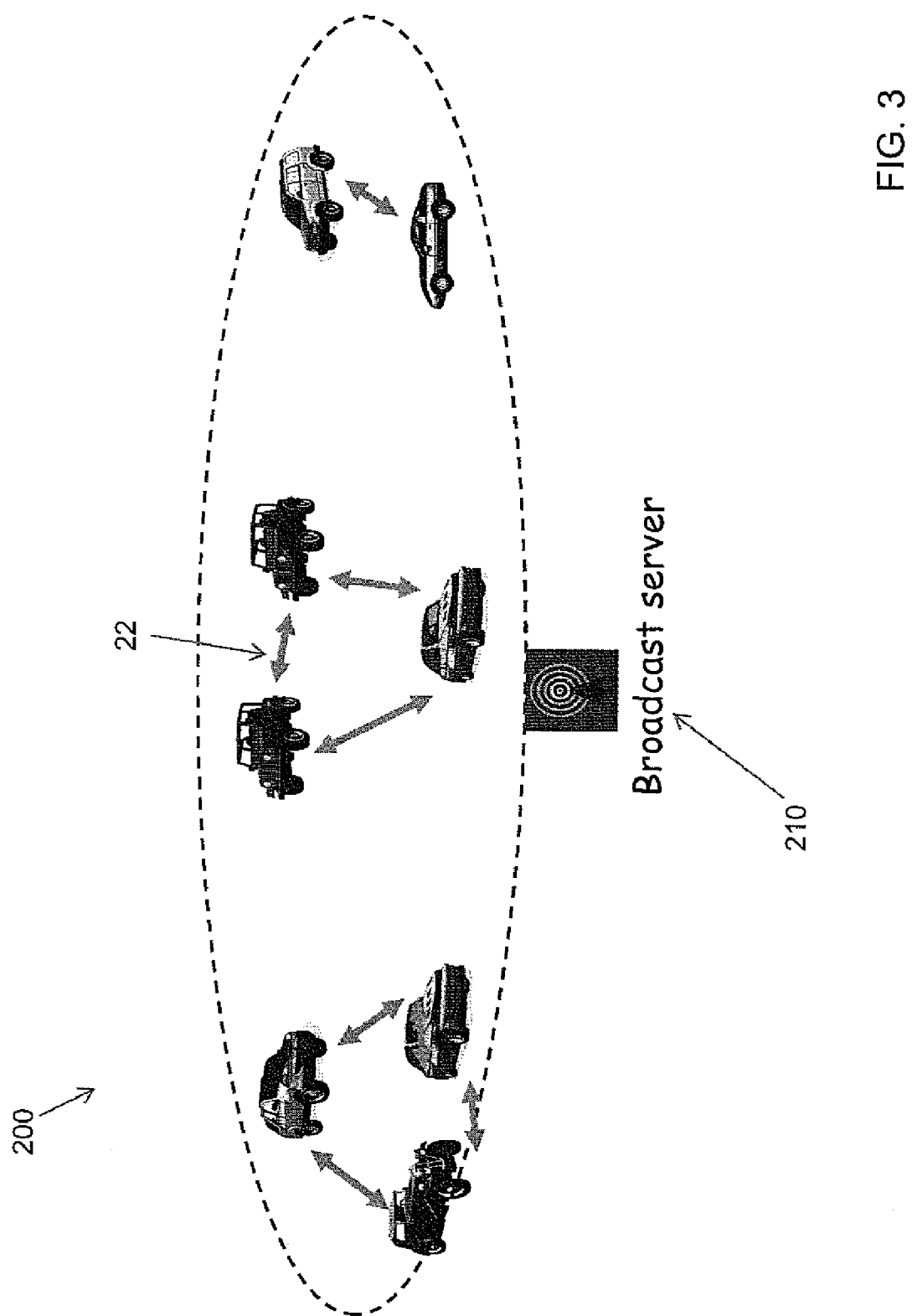
FIG. 3 is a schematic block diagram depicting a broadcast server communicating with vehicles, and vehicle to vehicle communications.

In a broadcast infrastructure server system 200, as shown in FIG. 3, the system 200 includes: broadcast servers 210 that can use satellite(s) to broadcast data to large regions or the entire country. From a mathematical point of view, these may be modeled as a single special fixed node in the communication graph $G(t)$ that is connected to all other nodes. The position of such broadcast infrastructure servers will not have significant impact on the system, however, the transmission latency and bandwidth may be constrained. The method of the present invention seeks to carry out all major certificate management operations while minimizing transmission latency and bandwidth required on such communication. The vehicles provide V2V communications 22 similarly as in FIG. 2.

Overall, the access point or base station that provides the network connectivity between a vehicle and the core infrastructure network can be any one of the above servers (as opposed to only using a server of one specific type). In other words, all vehicles do not have to use the same wireless technology to communicate with the certificate authority (CA) 74. One important technical difference among the above server types is how the CA messages are distributed to all vehicles. In the case of static and mobile servers, the vehicle in their neighborhood will also receive from the CA messages that the CA wants to distribute to other vehicles farther away. This "gateway" vehicle will then use vehicle-to-vehicle communication to distribute the messages to other vehicles. Instead, in the case of broadcast servers, a satellite is able to simultaneously send the same message to all receiving vehicles in the country.

Solutions and Certificate Management Operations

The present invention includes techniques to support vehicular network public-key infrastructure (VN-PKI) operations using a PKI module 90. The techniques meet the security requirements listed above, and also include the requirements: minimizing computation, latency and communication complexity in PKI operations; eliminating the need for roadside infrastructure networks; and reducing the need for any other types of infrastructure servers, such as static, mobile and broadcast servers.

VN-PKI Operations: Introduction

There are six main VN-PKI operations that vehicles need to perform to maintain the security and integrity of vehicle communications. These operations are: Assignment and installation of Initial Security Keys and Certificates; Message security operations; Replacement of Expired Certificates; Malicious Behavior Detection; Certificate Revocation List (CRL) Distribution; and Replacement of Revoked Certificates. The security component 70 manages the message security operations including a certificate management module 72 for replacement of expired certificates 78, and provides a certificate revocation list 76, and a certificate authority 74. A detection and response module 80 includes detecting malicious behavior 82, and mitigating malicious behavior 84.

With conventional PKIs, these operations would require vehicles to communicate frequently through infrastructure networks with the CAs. To eliminate reliance on roadside infrastructure servers and reduce reliance on static, mobile and broadcast infrastructure servers, the method and system of the present invention includes the initial security keys and certificates being assigned and installed on vehicles during the vehicle manufacturing process or at the vehicle dealerships before vehicles are sold, and therefore generally do not demand infrastructure network connectivity along roadways.

Certificates in a PKI-based system usually have an expiry attribute that is used to determine the validity of the certificates. When certificates expire, they need to be replaced. In a PKI-based vehicle network, certificate expiry is used for at least two purposes:

1. Help prevent CRLs from monotonically growing without end. Large CRLs are undesirable because they take more resources to distribute and consume vehicle resources when having to check whether or not a certificate is on the list. When a revoked certificate expires, it can be removed from the CRL, thereby helping to limit CRL growth.
2. Prevent credentials from remaining valid forever. It is advantageous, for instance, to let certificates in salvaged vehicles to expire rather to remain valid and a potential target of attackers.

Consequently, vehicles will periodically need to replace certificates that expire as part of their normal operation. The integrity of a PKI system and a V2V communications network depends upon effective malicious behavior detection capabilities to detect malicious behaviors, whether a certificate is used maliciously, and the malicious vehicles that are using V2V communications to cause harm to other vehicles or the communications system. These capabilities are necessary to determine which certificates should be revoked. These capabilities are also used for the vehicles to maintain safe and secure communications by being aware of malicious behaviors and responding to them to mitigate the impact. Such malicious behavior detection capabilities will be required regardless of the specific certificate management mechanisms being used.

Once a certificate is suspected or determined to be used in malicious activities, it can be revoked by a trusted authority such as the CA 74. CRLs 76 are the primary means used in a PKI system to rescind certificates that have been previously provided to a user. As part of the validation process, entities receiving data secured by a certificate will check the CRL 76 to determine if the certificate has been revoked. In a PKI-based vehicle network, each vehicle needs a current copy of a CRL issued by a trusted CA to verify the authenticity and integrity of V2V messages that are, for instance, exchanged among vehicles to support safety applications. Since CRLs change over time with the addition and deletion of entries, CRL lists need to be occasionally distributed to vehicles, the frequency of which depends on the rate of certificate revocation.

Further, attributes of the present invention include meeting the criteria that when one or more certificates used by a vehicle have been revoked, the revoked certificates are replaced. When a vehicle's privileges to receive certificates have been completely revoked, the system is able to make sure that this vehicle will no longer be able to receive replacement certificates. When certificates are shared among vehicles to provide privacy benefits, such as in a combinatorial certificate scheme, the act of revoking a single certificate affects many vehicles that share the certificate.

Assignment of Initial Security Keys and Certificates

In the method of the present invention, installing a vehicle's initial security keys and related certificates, and the current CRL can be done during the vehicle manufacturing process or, especially in the case of time-sensitive information such as the current CRL, at the vehicle dealerships before the vehicle is sold. The procedure can be successfully completed without any roadside infrastructure network connectivity. The generation of cryptographic keys for encryption and authentication can be done using state-of-the-art cryptographic algorithms for asymmetric encryption and digital signatures. In the method and system of the present invention, each vehicle needs, at any given time, at least the following keys (along with corresponding certificates), which are: one pair of public keys 92 and private keys 94 for digital signature to achieve message authentication and integrity protection.

Together with the initial keys and certificates, the dealership may also load the current CRL 76 onto the new vehicles, or vehicles that will then distribute the CRL to other vehicles via V2V communications.

Replacement of Expired and Revoked Certificates

Embodiments of the present invention provide certificate replacement for expired and revoked certificates. Users with a high level of infrastructure connectivity using a public-key infrastructure (PKI) system use pre-established highly trusted authorities referred to as the certificate authorities (CAs) which have the power to issue, revoke, and replace certificates. However, when there is limited or no infrastructure network connectivity, vehicles have difficulty obtaining replacement certificates from the CAs. When each vehicle has multiple certificates, such as when shared certificates are used to provide privacy support, the vehicle communications applications can continue to function should a subset of a vehicle's certificates be revoked, but possibly with lower privacy protection because it will need to reuse the working subset of certificates more often. However, if all of a vehicle's certificates are revoked, the vehicle can no longer actively participate in V2V communications by sending messages. It can, however, still act as a passive observer and report events to the driver should the system determine its integrity has not been compromised although its certificates are revoked. With limited or no infrastructure for communications between vehicles, existing certificate management techniques could result in a large number of vehicles without valid certificates which could significantly reduce the effectiveness of the vehicles' communications applications and could eventually bring the communications applications to a stop when a high percentage of the vehicles run out of valid certificates.

The method 10 of the present invention includes procedures to replace expired and revoked certificates, ensuring that new certificates are only received by the intended vehicles. Replacing revoked certificates can be carried out in essentially the same way as replacing expired certificates, except that separate investigation procedures may be needed to determine which certificate should be revoked, and whether a vehicle should be allowed to continue to receive new replacement certificates. The replacement of expired certificates is discussed below.

The techniques below can adapt to fit the availability of infrastructure network options. For instance, when static or mobile infrastructure servers are available, they can send a certificate replacement message to potentially distant vehicles across the vehicular network either directly, or first to a subset of vehicles which use V2V communications to distribute the message to a destination vehicle. In the case of broadcast infrastructure servers, a one-way broadcast is used to support the certificate replacement operation. In both cases, because of the cryptographic protections, this message will be successfully received only by the intended vehicles.

With conventional certificate management, a user interacts directly with the CA to obtain a replacement certificate. Specifically, a bidirectional connection will be established between the user and the CA, during which the user and the CA mutually authenticate each other and then exchange the keying and certificate materials. This becomes difficult when vehicles have sparse infrastructure network connectivity. According to the present invention, the following technique is used which allows certificate management when sparse infrastructure connectivity is available:

1. Procedure based on client-server proximity, using either static or mobile infrastructure servers;
2. Procedure based on geographically-controlled network flooding, using either static or mobile infrastructure servers;
3. Procedure based on nationwide broadcasting, using broadcast infrastructure servers.

In the first technique, a vehicle with an expired certificate contacts the CA 74 when it moves into the radio coverage area of an infrastructure radio base station such as a static 110 (FIG. 2) or mobile server to request a replacement certificate. Additionally, the vehicle will also receive from the CA 74 encrypted certificate replacement messages intended to be received by other vehicles and then serve as a relay point to use V2V communications 22 to forward the message toward the destination vehicles.

In the second technique, the vehicle with an expired certificate sends an encrypted and signed request for certificate update to its neighbor vehicles, which will use V2V communications 22 to relay the message to the closest infrastructure server 110 or 210. Because vehicles know their current geographic positions and the approximate locations of the closest static or mobile infrastructure server 40, the V2V 22 relay can be efficiently restricted to the geographic area from the vehicle's position to the location of the closest infrastructure server. After receiving the request, the infrastructure server replies with an encrypted (using a symmetric key sent by the requesting vehicle within its encrypted request message) and signed certificate replacement message, and sends the reply using a similarly geographically-controlled flooding procedure. If required, a signed confirmation message may also be sent back from the vehicle to the server to guarantee that the procedure successfully completed.

In the third technique, a signed certificate replacement message containing encrypted key and certificate replacement materials are broadcast via one-way satellite broadcasting services (broadcast server 210, FIG. 3) that can be received by many vehicles. The vehicle with the expired certificate uses its satellite receiver to obtain this message and decrypt its replacement certificate. This non-interactive procedure will be successful when the vehicle's receiver is turned on. The same message could be broadcast multiple times (e.g., once a day over a period of a few days, or periodically over a selected period of time) so that the probability that a vehicle does not receive any one of these satellite's messages can be estimated to be negligently low.

The application of the above three techniques can show that any one of these three procedures provides effective and secure replacement of expired or revoked certificates, under standard cryptographic assumptions.

Malicious Activity Detection and Mitigation

In V2V communications 22 with no infrastructure network support, the vehicles rely on themselves and distributed techniques to detect malicious communications activities and to mitigate the impact of malicious vehicles by evicting suspected malicious vehicles from the system (i.e., to ignore the messages sent from suspected malicious vehicles). Such a capability allows vehicles to communicate securely without being excessively impacted by malicious activities and without relying on infrastructure network connectivity.

Two techniques in which vehicles decide locally whether or not to evict a suspected malicious vehicle for V2V vehicular communications networks are:

1. voting mechanisms; and
2. sacrifice by individual vehicles, in which a suspected device is evicted together with its accuser.

In a voting mechanism, vehicles vote by exchanging signed claims of impropriety of another vehicle. Each vehicle then adds these warning messages to its accusation list. Once the warning votes against a vehicle exceed a threshold, the accused vehicle is placed on a blacklist, similar to a local or temporary CRL. For nodes which are placed on the blacklist, additional "disregard this vehicle" messages will be broadcast to other vehicles. Typically, the majority vote principle is used to decide when to deem a vehicle untrustworthy.

A majority vote detection mechanism relies on an "honest majority", i.e., every node must have more good neighbors than bad. Therefore, a local majority can have a significant effect on the dynamics of the voter model. For example, bad nodes can eliminate good nodes if they form a local majority. Good nodes can eliminate bad nodes if they have a local majority.

In a sacrifice based model, any vehicle can evict any other vehicle by simultaneously agreeing to limit its own participation in future V2V communications hence giving his decision more credibility. Therefore, in this scheme it is easier to evict a node than in a vote-based mechanism where majority votes from multiple vehicles are used to decide whether to evict a vehicle. However, abuse of the sacrifice-based mechanisms is made more costly by forcing simultaneous removal of the accuser. For example, "Disregard" messages by an accuser cause simultaneous disregard of both the suspected node and its accuser.

Techniques for vehicles to detect message-originated malicious behaviors are discussed below, including detecting framings or unjustified accusations of innocent vehicles by malicious vehicles. Message-oriented malicious behaviors refer to malicious behaviors consisting of one or more vehicles generating messages differently from what is prescribed in the message security procedure(s). Specifically, described below are distributed procedures that can be used by vehicles to rely only on themselves to detect and mitigate malicious activities, that is, that no help is needed from infrastructure servers.

The proposed procedures are based on the following criteria:

An authenticated voting procedure in the attacker's neighborhood for vehicles to agree on whether a given vehicle's messages are malicious;

A V2V network flooding procedure to transmit the election transcript along with any resulting CRL updates to other vehicles; and A threshold anomaly detection mechanism to check whether a given vehicle is taking part in an excessively large number of elections (for example, to accuse many innocent vehicles by declaring their messages as malicious).

The method of the present invention includes:

1. one or more vehicles noting suspicious messages from a neighbor vehicle, pointing out this fact to all their neighbors and calling for an election to agree on whether these messages are malicious.
2. All neighbors send a digitally signed vote (for example, from the set {malicious, not malicious, don't know}), a majority vote decision is generated and the certificates of both the suspected vehicle and the voters are placed on an eviction list (a "self sacrifice" effect as described above) (i.e., similar to adding them to the CRL) and sent to all other vehicles using a controlled network flooding procedure.
3. The vehicles receiving these new eviction lists will include these newly evicted keys on their eviction lists (so that future messages based on these keys are ignored).
4. Each entry in the eviction list will also have a counter keeping track of the number of election participations for each of the voters. If a voter has exceeded a pre-specified threshold number of election participations (dependent on timing parameters and traffic conditions in that specific geographic area), its votes will be ignored. The excessive voter will be reported to the CA when the discovering vehicles can establish a network connection with the CA, which could in turn revoke the associated certificates and the excessive voter vehicle's privilege to receive future certificate replacements.

The above method includes several novel aspects, including:
Combining the benefits of majority voting with the principle of sacrifice to not only make it difficult for malicious vehicles to evict innocent vehicles, but also to significantly limit the impact of malicious vehicles. For example, if a group of malicious vehicles uses its majority in a local area to evict innocent vehicles, these malicious vehicles will have to sacrifice themselves in the process (i.e., having themselves evicted as well); and
Detecting framings of multiple innocent vehicles by malicious vehicles, which is a potential weakness of all election-based procedures for the detection of malicious behavior.

Certificate Revocation List Distribution

One issue for a vehicular network which is resolved by the embodiments of the present invention relates to CRL (certificate revocation list) distribution. Vehicles in the vehicular network need to receive the CRLs in a timely fashion. Without proper management, CRLs can be very large in size, and therefore require significant wireless network bandwidth to distribute. When vehicles have little or no infrastructure network connectivity, they will have to rely on other means to receive CRLs or use new techniques to ensure continuous safe and secure operations without CRLs for extended periods of time.

The method of the present invention includes updating and distributing Certificate Revocation Lists (CRL) to all vehicles in a V2V network to ensure that all vehicles in the network maintain a very recent version of the CRL. These methods are based mainly on broadcasts from a satellite to large areas or an entire country, or from infrastructure servers to all vehicles in their closest geographic area using appropriate flooding-based distribution protocol. Considering low or no connectivity scenarios (e.g., vehicles with their satellite receiver being turned off, or vehicles with limited mobility range in rural areas, or vehicles not receiving CRL updates due to any type of temporary lack of connectivity), a vehicle-to-vehicle procedure may be used where the vehicle with the oldest CRL updates it from another vehicle having a newer version of the CRL.

Certificate Revocation Lists (CRLs) are public data meant to be openly distributed to any entity or application that needs them. To provide a CRL with integrity protection and authentication, a CRL is typically accompanied by a digital time-stamp, and both the CRL and the time-stamp are digitally signed by the issuing CA. In conventional certificate management, a user interacts directly with the CA to periodically obtain the most recent CRL. Specifically, a permanent connection can be established between the CA and its user, during which the user and the CA mutually authenticate each other, and the CA sends the updated CRL to the user. In vehicular networks, this process is complicated because vehicles may have to remain disconnected for some non-trivial amount of time from any type of infrastructure servers, and thus the vehicles need assistance in establishing the required connection. Infrastructure solutions providing help to vehicles to receive updates includes both static and mobile infrastructure servers, satellites, and performing an update procedure between any two neighbor vehicles, including:
1. A CRL distribution procedure based on geographically-controlled network flooding, using either static or mobile infrastructure servers;
2. A CRL distribution procedure based on nationwide broadcasting, using broadcast infrastructure servers; and
3. A CRL update procedure based on CRL comparison, performed between any two vehicles.

The distribution procedure based on network flooding includes selecting a time period depending on the rate of revoked certificates, and the CA specifying a periodic broadcast of the most recent CRL. The broadcast includes each static or mobile infrastructure server being given a copy of the same CRL, and distributing it to all vehicles via a geographically controlled flooding protocol (e.g., dividing the country into geographic areas each being covered by one or a very few infrastructure servers, and the CRL broadcasted by an infrastructure server is only forwarded to neighboring vehicles from vehicles driving in the server's specific geographic area).

In a variation on this procedure, a newly purchased vehicle, and/or vehicles that recently visited dealerships, can receive at the dealership the CRL from the CA, and then serve as relays to use vehicle to vehicle (V2V) communications to distribute the CRL to other cars. In another embodiment of the invention, a distribution procedure based on nationwide broadcasting may include only one server (e.g., a satellite) that is broadcasting the latest CRL to all vehicles in a country.

An update procedure based on CRL comparison may be applied between a vehicle that has an old version of the CRL, and its neighboring vehicles with a more recent CRL version, wherein the former vehicle replaces its CRL with the latter's CRL. A communication-efficient protocol can be used that minimizes the length of the messages exchanged between the two vehicles (that is, exchanging significantly less information than merely exchanging the two CRLs, when the difference is relatively small in the CRLs).

Privacy Enhancements

Assignment of Initial Security Keys and Certificates

In the above embodiments of the invention, the method included a single and independently generated signature key or identifying key per vehicle. To achieve more privacy, another embodiment of the method includes vehicles having multiple signature keys, called anonymous keys (certificates) 96, each one not including driver or vehicle identifying information and being valid for a distinct, short (e.g., 10 minutes) and predetermined validity time period (e.g., from Jan. 1, 2000, 2 pm to Jan. 1, 2000, 2:10 pm), during which it can be used precisely as the single key discussed in the above embodiments. The number of such keys is large enough so that the union of all the validity time periods covers a sufficiently large time interval (e.g., 1 year).

Message Security Operations

Even if it has multiple keys, the vehicle can use only one of the multiple keys to sign its messages, and, precisely, the key whose certificate is currently valid. There is only one such key as all certificate validity time periods are disjointed.

Replacement of Expired and Revoked Certificates

Using multiple keys, a vehicle can wait until it exhausts all certificates (e.g., 1 year) to renew them. Certificates can be replaced and revoked as described in the manner above in the section entitled Replacement of Expired and Revoked Certificates, with the variation that multiple certificates are obtained, rather than a single one. Similarly, certificate revocation list distribution can be achieved as above.

Malicious Behavior Detection

Malicious behavior detection using multiple keys is similar to the single key case described under the section entitled Replacement of Expired and Revoked Certificates, which includes voters giving up their privacy by using an identifying key, i.e., the public or private keys, to sign their votes. Furthermore, voters request the suspected vehicle to also provide a signature based on this identifying key. The identifying key and all anonymous keys 96 will be revoked. If the suspected vehicle fails to provide a signature with its identifying key, the vehicle's anonymous keys 96 will be revoked. Finally, a pre-set threshold is used by infrastructure servers to verify whether there exists a vehicle for which too many anonymous keys have been revoked, in which case, the vehicle's identifying key is also revoked. Additionally, an alarm mechanism 99 may include receiving notification of a security threat and initiating threat mitigation procedures, as well as communication of an alleged threat to a certification authority.

Certificate Revocation List Distribution

The privacy enhanced techniques can use the same protocols as described above for the CRL distribution and update.

The embodiments of the invention discussed herein provide a method for managing unique security and privacy threats, and communication requirements in vehicular networks with limited infrastructure servers. Further, the embodiments of the present invention may provide the advantages of eliminating and/or minimizing the need for various types of costly infrastructure servers, while maintaining desired security, privacy and performance requirements.

Additionally, the embodiments of the present invention provide malicious behavior detection to ensure safe and secure operation of a vehicle communications system. In the embodiments of the present invention, malicious vehicles which cause significant harm to the vehicle networks and applications are detected and evicted or barred from the vehicle communications network. If vehicles have frequent infrastructure network connectivity, they can rely on trusted servers in the infrastructure network to detect and respond to security threats. These infrastructure servers could collect information from a large number of vehicles and have sufficient processing capabilities to analyze the data to detect malicious activities. However, when vehicles have sporadic or no infrastructure connectivity along the roads, attackers could perform attacks without being monitored by any highly trusted entities such as infrastructure servers. Vehicles with sporadic or no infrastructure connectivity cannot rely on any infrastructure-based servers to help detect malicious activities. As a result, the attacks described above can have much higher chances to be successful, and the attackers would have a much higher chance of being undetected. Therefore, in the embodiments of the present invention, vehicles rely on themselves and interactions with other potentially untrusted vehicles to detect malicious activities and mitigate their impacts.

Thereby, the embodiments of the present invention provide a method for a public-key infrastructure (PKI) for vehicular networks. The PKI meets requirements of entity and data authentication, integrity and confidentiality, as well as malicious behavior detection, and malicious vehicle revocation. The PKI of the embodiments of the present invention use a minimized number of infrastructure servers.

The embodiments of the present invention can be modeled using a computer system to generate, for example, solutions for routing of key refresh and update requests, update of certificates and certificate revocation lists, malicious behavior detection and resulting key updates.

Figure 4A:
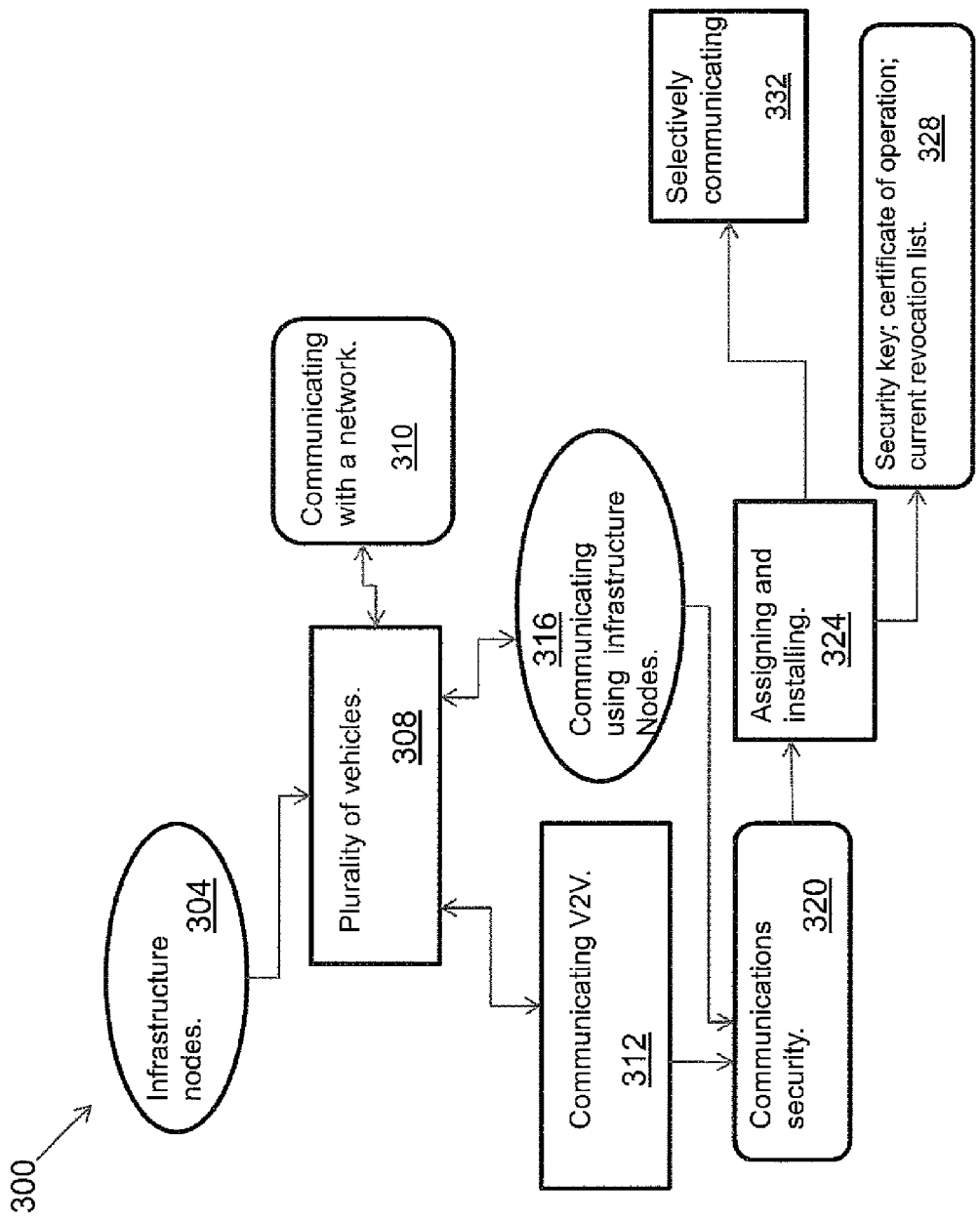
FIG. 4a is a flow chart illustrating a method according to an embodiment of the invention for providing a vehicular communications network.

Referring to FIG. 4a, a method 300 for providing a vehicular communications network according to an embodiment of the invention includes the following steps. Step 304 provides a plurality of communications infrastructure nodes. Step 308 provides a plurality of vehicles each having a communications component. The vehicles can communicate with the network 50 in step 310. The vehicles can communicate vehicle to vehicle (V2V), using the communications components in step 312. In step 316 the vehicles communicate with the infrastructure nodes 40. The method 300 provides security for the communications between the plurality of vehicles in step 320. Step 324 includes assigning and installing, in the plurality of vehicles, security which includes in step 328, a security key, a certificate of operation, and a current certificate revocation list. Step 332 includes selectively communicating between the plurality of vehicles.

Figure 4B:
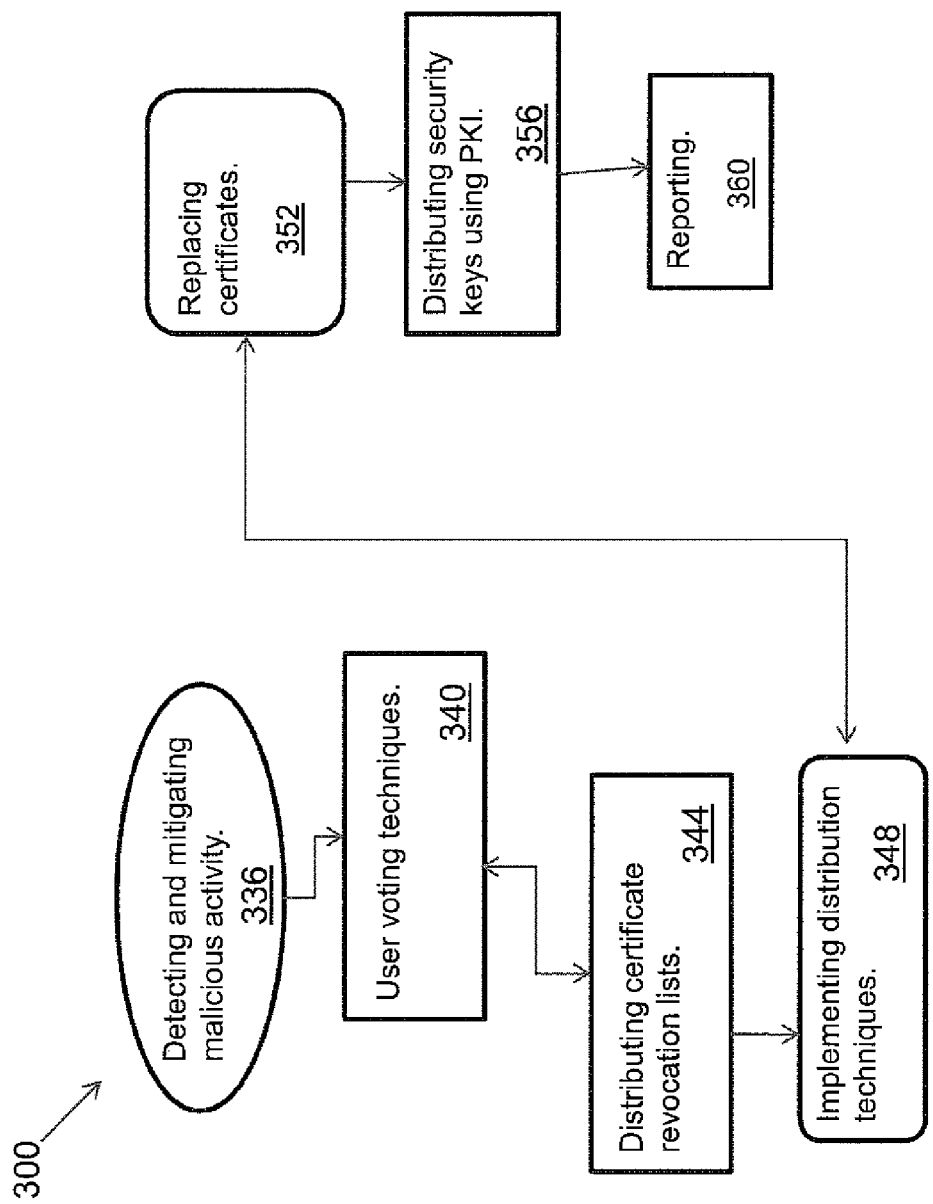
FIG. 4b is a continuation of the flow chart illustrated in FIG. 4a for providing a vehicular communications network.

Referring to FIG. 4b, the method 300 includes the step of 336 which includes detecting malicious activity in communications between the vehicles, and mitigating the malicious activity. In step 340 the mitigation of the malicious activity includes user voting techniques. Step 344 includes distributing an updated certificate revocation list (CRL) to each vehicle in the network using the V2V communications, or using the communication infrastructure nodes. Step 348 includes implementing distributing techniques for distributing an updated certificate revocation list, which includes: flooding a geographically-controlled network; broadcasting on a nationwide network; and the V2V communications for comparing certificate revocation lists between the plurality of vehicles. Step 352 includes replacing expired and revoked certificates by distributing updated certificates to the plurality of vehicles in the network using the V2V communications, or using the communication infrastructure nodes. Distributing the updated certificates may include using at least one of the following techniques wherein the communication infrastructure nodes are static and/or mobile: flooding a geographically-controlled network; broadcasting on a nationwide network; and the V2V communications for comparing certificate revocation lists between the plurality of vehicles. The method may further include step 356 wherein distributing one or more updated security keys using a public key infrastructure includes distributing one or more of a plurality of security keys, including: a public key 92, a private key 94, an anonymous key 96, an identifying key, and a management key 98. The method 300 may include in Step 360, reporting a certificate revocation to a remote infrastructure node which may be remote from the plurality of vehicles and may communicate with the plurality of vehicles.

Referring to FIG. 5, a computer system 400 according to an embodiment of the invention, may be used in conjunction with, or as part of, a server node, vehicle computer or other static or mobile devices, includes a computer 420. The computer 420 includes a data storage device 422 and a software program 424, for example, an operating system or a program implementing instructions to achieve a result. The software program or operating system 424 is stored in the data storage device 422, which may include, for example, a hard drive, or flash memory. The processor 426 executes the program instructions from the program 424. The computer 420 may be connected to the network 50, which may include, for example, the Internet, a local area network (LAN), or a wide area network (WAN). The computer 420 may also be connected to a data interface 428 for entering data and a display 429 for displaying information to a user. A peripheral device 450 may also be connected to the computer 410.

As will be appreciated by one skilled in the art, aspects of the embodiments of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to as a "circuit," "module" or "system." Furthermore, aspects of the present invention may take the form of a computer program product embodied in one or more computer readable medium(s) having computer readable program code embodied thereon. Further, combinations of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (and/or systems), and computer program products according to embodiments of the invention. It will be understood that blocks of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for providing vehicular communications network security, comprising:
provide a plurality of vehicles in a specified geographic area, each of the plurality of vehicles having a communications component;
providing a plurality of communications infrastructure nodes, one or more of the communication infrastructure nodes being static, the plurality of communications infrastructure nodes being unable to provide a data connection to each of the plurality of vehicles such that a number of the vehicles having the data connection is greater than one and less than a number of total vehicles in the specified geographic area;
communicating between the vehicles using the plurality of communication infrastructure nodes;
communicating vehicle to vehicle (V2V) using the communication components;
providing security for the communications between the plurality of vehicles;
assigning and installing in the plurality of vehicles at least one security key, a certificate of operation, and a recent certificate revocation list; and
securing communications between the plurality of vehicles using the at least one security key, the certificate of operation and the recent certificate revocation list.

2. The method of claim 1, further comprising:
detecting malicious activity in communications between the vehicles; and mitigating the malicious activity.

3. The method of claim 2, wherein the malicious activity includes:
   denying services or creating physical, psychological or financial harm to at least one of the plurality of vehicles.

4. The method of claim 2, wherein the step of mitigating the malicious activity includes:
   users voting as a group, including: a majority voting technique; and a self sacrifice voting technique; or a combination of the majority voting technique and the self sacrifice voting technique.

5. The method of claim 1, wherein the step of assigning and installing in the plurality of vehicles occurs during manufacture of the vehicle or at a vehicle dealer.

6. The method of claim 1, further including:
   distributing an updated certificate revocation list to each vehicle in the network using the V2V communications, or using the communication infrastructure nodes;
   excluding one or more vehicles on the certificate revocation list from the network.

7. The method of claim 6, wherein the step of distributing the updated certificate revocation list includes at least one of the following techniques:
   flooding a geographically-controlled network;
   broadcasting on a nationwide network; and
   using the V2V communications for comparing certificate revocation lists between the plurality of vehicles.

8. The method of claim 1, further including:
   replacing expired and revoked certificates by distributing updated certificates to the plurality of vehicles in the network using the V2V communications, or using the communication infrastructure nodes.

9. The method of claim 8, wherein the step of distributing the updated certificates includes using at least one of the following techniques:
   flooding a geographically-controlled network;
   broadcasting on a nationwide network; and
   using the V2V communications for comparing certificate revocation lists between the plurality of vehicles.

10. The method of claim 1, further comprising:
    distributing one or more updated security keys to each of the plurality of vehicles.

11. The method of claim 10, wherein the step of distributing one or more updated security keys includes distributing one or more of a plurality of security keys, including:
    a public key, a private key, one or more anonymous keys, an identifying key, and a management key.

12. The method of claim 1, wherein a security component includes public key infrastructure (PKI).

13. The method of claim 1, further comprising:
    reporting a certificate revocation to a remote infrastructure node.

14. The method of claim 1, wherein a certificate authority server is remote from the plurality of vehicles and communicates with the plurality of vehicles using intermediate vehicles.

15. A system for providing vehicular communications network security, comprising:
    a plurality of vehicles in a specified geographic area, each of the plurality of vehicles having a communications component, the communications component providing vehicle to vehicle (V2V) communications;
    a plurality of communications infrastructure nodes, one or more of the communication infrastructure nodes being static, the vehicles communicating with each other using the plurality of communications infrastructure nodes, the plurality of communications infrastructure nodes being unable to provide a data connection to each of the plurality of vehicles during any specified time period, such that a number of the vehicles having the data connection is greater than one and less than a number of total vehicles in the specified geographic area during any specified time period;
    a communications security component in each of the plurality of vehicles providing security for the communications between the plurality of vehicles, the communications security component including a plurality of security modules, the security modules including:
    a certificate management module including certificates, and a certificate revocation list;
    a public key interface module including at least one of: a public key, a private key, an anonymous key and a management key;
    a detection and response module for attack detection and attack mitigation;
    the communications security component having assigned and installed at least one security key, a certificate of operation, and a current certificate revocation list, the communications component providing secure communications between the plurality of vehicles including vehicle to vehicle communications, and vehicle communication using the nodes.

16. The system of claim 15, further comprising:
    a certification authority at least occasionally communicating with the plurality of vehicles.

17. The system of claim 15, wherein the certificate management module includes a certificate authority located on one or more of the infrastructure nodes.

18. The system of claim 15, further comprising:
    an alarm mechanism being part of the security component, the alarm mechanism initiating a security breach report when a certificate is revoked.

19. The system of claim 15, wherein the communications infrastructure nodes include computer systems communicating with computer systems in the vehicles.

20. A method for providing security for a vehicular communications network, comprising:
    providing a plurality of vehicles in a specified geographic area, each of the plurality of vehicles having a communications component;
    providing a plurality of communications infrastructure nodes, one or more of the communication infrastructure nodes being static, the plurality of communications infrastructure nodes being unable to provide a data connection to each of the plurality of vehicles during any specified time period, such that a number of the vehicles having the data connection is greater than one and less than a number of total vehicles in the specified geographic area during any specified time period;
    providing security for communications between the plurality of vehicles;
    assigning and installing in the plurality of vehicles at least one security key, a certificate of operation, and a current certificate revocation list;
    selectively communicating between the plurality of vehicles including vehicle to vehicle communications and the nodes;
    securing communications between the plurality of vehicles using the at least one security key, the certificate of operation and the current revocation list;
    detecting malicious activity in communications between the vehicles; and
    mitigating the malicious activity including the technique of:

users voting as a group, including: a majority voting technique; and a self sacrifice voting technique; or a combination of the majority voting technique and the self sacrifice voting technique.

21. The method of claim 20, further including:
distributing an updated certificate revocation list to each vehicle in the network excluding one or more vehicles on the certificate revocation list from the network; and
the step of distributing the updated certificate revocation list includes at least one of the following techniques:
flooding a geographically-controlled network;
broadcasting on a nationwide network;
the V2V communications for comparing certificate revocation lists between the plurality of vehicles.

22. The method of claim 20, further including:
replacing expired and revoked certificates by distributing updated certificates to the plurality of vehicles in the network; and
distributing the updated certificates includes using at least one of the following techniques:
flooding a geographically-controlled network;
broadcasting on a nationwide network;
the V2V communications for comparing certificate revocation lists between the plurality of vehicles.

23. The method of claim 20, further comprising:
distributing one or more updated security keys to each of the plurality of vehicles including:
a public key, a private key, an anonymous key, an identifying key, and a management key.

24. A computer program product comprising a computer readable storage device having recorded thereon a computer program, a computer system including a memory device and the computer system including a processor for executing the steps of the computer program for providing vehicular communications network security, wherein a plurality of communications infrastructure nodes are provided, and a plurality of vehicles each having a communications component are provided, and the plurality of vehicles being in a specified geographic area; the program steps comprising:
communicating between the vehicles using the plurality of communication infrastructure nodes, one or more of the communication infrastructure nodes being static, the plurality of communications infrastructure nodes being unable to provide a data connection to each of the plurality of vehicles such that a number of the vehicles having the data connection is greater than one and less than a number of total vehicles in the specified geographic area;
communicating vehicle to vehicle (V2V) using the communication components;
providing security for the communications between the plurality of vehicles;
assigning and installing in the plurality of vehicles at least one security key, a certificate of operation, and a recent certificate revocation list; and
securing communications between the plurality of vehicles using the at least one security key, the certificate of operation and the recent certificate revocation list.

* * * * *